Feb. 3, 1970  J. A. F. TALLON ET AL  3,493,807
COLD CATHODE MANOMETER
Filed May 8, 1967  2 Sheets-Sheet 1

Feb. 3, 1970     J. A. F. TALLON ET AL     3,493,807
COLD CATHODE MANOMETER

Filed May 8, 1967     2 Sheets-Sheet 2

United States Patent Office 3,493,807
Patented Feb. 3, 1970

3,493,807
COLD CATHODE MANOMETER
Jacques André Frank Tallon and Gilbert Maurice Gontero, Annecy, France, assignors to Societe Anonyme: Societe Alsacienne de Constructions Atomiques de Telecommunications et d'Electronique "Alcatel," Paris, France, a corporation of France
Filed May 8, 1967, Ser. No. 636,883
Claims priority, application France, May 9, 1966, 60,805
Int. Cl. H01j 1/50, 23/10
U.S. Cl. 313—161                8 Claims

ABSTRACT OF THE DISCLOSURE

A cold cathode manometer includes a magnet which defines a gap and has N pairs of poles; and at least two electrodes, an anode and a cathode which are located in the gap, are separated from each other by a space and are so disposed relatively to each other as to allow free passage for magnetic fluxes between the pairs of poles. In use, a plurality of N adjacent plasmas is formed in the space separating the anode from the cathode and in the gaps between the poles. The signs and magnetic intensities of the poles are such that, in two adjacent plasmas, the magnetic fields are parallel and of substantially the same intensity but of opposite direction.

---

The invention relates to a cold cathode manometer in which a plurality of distinct plasmas are formed in a magnet gap with a plurality of pairs of poles. More especially, the magnet gap has two pairs of poles. The cathode is an aluminium tube with an axial boring of elliptical cross-section, and the anode is a thin aluminium plate inserted within the said boring and comprises two openings respectively facing the pairs of poles.

An object of the invention is to provide a device for measuring low pressures and more particularly a cold cathode manometer in which multiple plasmas are formed.

It is well known that industrial measurement of low pressures is one of the most difficult problems which arise in vacuum techniques. In particular, when measuring pressures of between $10^{-2}$ mm. Hg and $10^{-6}$ mm. Hg (that is, from 1.33 to 1.33 $10^{-4}$ Pascal), measurement is usually effected by means of cold cathode ionization manometers, known as Penning gauges. These consist of two electrodes (an anode and a cathode) disposed in a magnet gap. The strength of these apparatus and their facility of use is the reason why they are preferred to all other types of instrument for industrial measurement. However, it is known that the accuracy and stability of these manometers leaves much to be desired, more especially when measuring fairly high vacua. The local variation in ionisation which occurs between the electrodes when the vacuum becomes high causes instability in the measuring current which is then produced incoherently and is prejudicial to the stability of measurements. It previously has been proposed to correct this defect by connecting a capacitor in parallel with the reading apparatus. This capacitor is adapted to integrate the current variations but does not, however, enable the desired stability of measurement to be obtained.

Consequently, the invention proposes to ensure stabilization and accuracy of measurements by other means which act directly upon the cause of these instabilities. Research carried out in the development of the present invention has only not permitted the desired stabilization to be obtained but also has resulted in an increase in the strength of the measuring current by constituting a multiplicity of distinct plasmas in the control volume.

Therefore, in accordance with this invention, a cold cathode ionisation manometer comprises at least two electrodes, an anode and a cathode, positioned in the gap of a magnet which has a plurality of N pairs of poles, the relative arrangement of the cathode and anode being such that they allow free flow of magnetic flux between the said N pairs of poles, which causes the formation of a plurality of N plasmas in the volume between the anode and the cathode in each of the gaps of N pairs of poles, the signs of said poles being such that in two adjacent plasmas the magnetic fields are parallel, of the same intensity but of opposite polarity.

In operation of the manometer of the invention the ions of two adjacent plasmas are moved in a manner which maintains them between the electrodes in a strictly determined volume opposite the corresponding pole pieces, without an interaction being produced between plasmas. Owing to the relative arrangement of the electrodes, the establishment of a gaseous discharge between other parts of the manometer is prevented.

Thus, in an advantageous form of embodiment of the invention, there are disposed in the gap of a magnet having N pairs of poles a substantially cylindrical cathode having a longitudinal axial channel being made of a non-magnetic conductive material, and an anode in the form of a thin plate placed within the said channel, in which N openings are formed positioned respectively between the said N pairs of poles, the anode being generally formed from a non-magnetic conductive material.

In a modification, the openings formed in the anode plate are replaced, totally or partially, by small cylinders open at both ends, the axes of which are perpendicular to the plane of the plate, that is, substantially parallel to the lines of force of the respective magnetic fields of each pair of poles.

According to a simple form of embodiment the manometer comprises a magnet with two pair of poles, in which case the anode plate has two openings, or open cylinders, respectively facing the said pairs of poles.

The invention will be illustrated hereinbelow by an example of an embodiment of a manometer with two pairs of poles as shown in the accompanying drawings in which.

Figure 1:
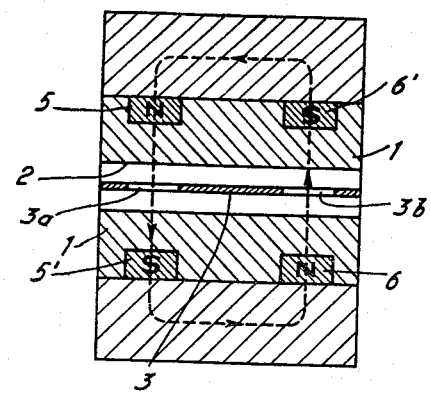
FIG. 1 is a diagrammatic axial cross-section of the manometer of the invention.
Figure 2:
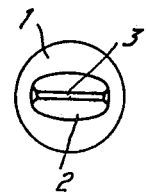
FIG. 2 is an end view of the mounting of the cathode and anode of the manometer of FIG. 1.

In the manometer shown in FIGS. 1 and 2, the cathode 1 has a generally cylindrical shape machined in a non-magnetic conductive body, such as aluminium. The cathode chamber 2, cut out of a block, is polished interiorly.

The interior shape of chamber 2 is advantageously simple; so in the illustrated assembly its cross-section has the form of an ellipse flattened at the ends of the main axis as shown in FIG. 2.

Figure 3:
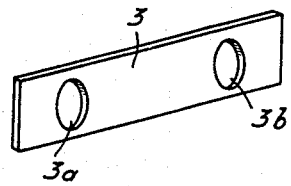
FIG. 3 is a perspective view of the anode used in combination with the cathode of FIG. 1.
Figure 4:
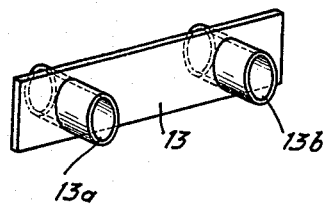
FIG. 4 is a perspective view of a modified form of anode.

Anode 3 consists of a simple thin plate of a non-magnetic conductive body, such as aluminium, and has openings 3a, 3b pierced in it, in a number equal to the number of local plasmas to be formed, two in the illustrated embodiment. In the modification shown in FIG. 4, the anode plate 13 comprises, in the locations and planes of the circular openings 3a and 3b of FIG. 3, small cylinders 13a, 13b, of the same diameter as the circular openings 3a and 3b, open at both ends, the axis of each cylinder 13a, 13b being perpendicular to the plane of the plate 13.

The arrangement of the manometer of the invention is shown diagrammatically in FIG. 1. Outside cathode 1, immediately adjacent to and on either side of same, are disposed pairs of North and South pole pieces 5, 5' and 6, 6', respectively facing circular openings 3a, 3b of anode 3. According to the invention, the arrangement of the pole pieces is such that poles of opposite sign are on each side of the cathode. In the present case the magnetic circuit comprises two gaps, the facing pole pieces being respectively 5 (North) and 5' (South) for the first gap, and 6' (South) and 6 (North) for the second gap. Cylinder 1 constituting the cathode is positioned between the pole pieces 5, 6' on one side of the cylinder, and 5', 6 on the other side thereof. This arrangement makes it possible to create, through the successive circular openings of the anode, magnetic fields of equal value but opposite sign directed in a substantially perpendicular direction to the cathode. As an example, a line of force of an induced magnetic field is shown by dotted lines in FIG. 1. The gaseous discharge is thus localized in the gaps.

It should be noted that the invention is not limited to the example which has been given purely by way of explanation. The invention relates in a general manner to manometers having N pairs of poles and plasmas and not only to manometers having only two such pairs.

The manometers of the invention have all qualities of strength of the Penning gauge without the drawback of instability which has been noted in conventional prototypes. Compared with the industrial manometers heretofore known, it has the advantages of accuracy and precision which have hitherto only been known in precision apparatus of more fragile construction and which are more difficult to use.

Figure 5:
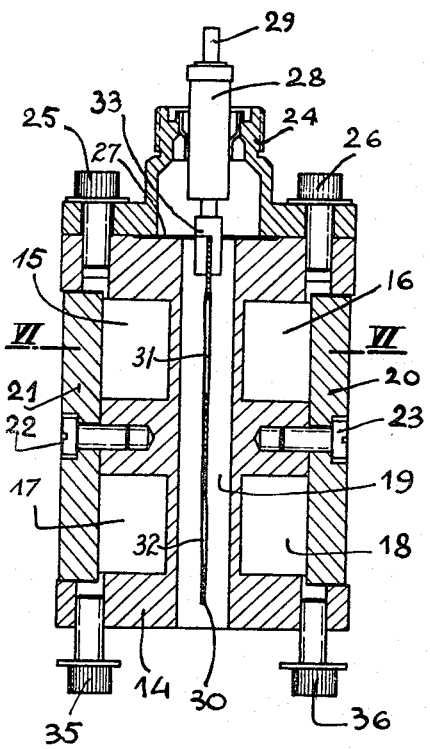
FIG. 5 shows a form of embodiment of the manometer in cross-section along line V—V of FIG. 6.
Figure 6:
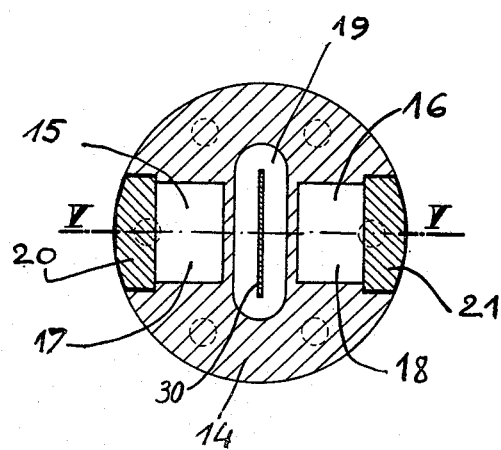
FIG. 6 is a horizontal cross-section along line VI—VI of FIG. 5.

Referring to FIGS. 5 and 6, 14 is the cathode consisting of a stainless steel body having a cylindrical periphery.

Gaps 15, 16, 17, 18 formed in the cylindrical body 14 are positioned on the periphery and house the pole pieces. These pole pieces, disposed in gap housings 15, 16, 17, 18, are made of special steel known under the name of "Ticonal," and are parallelipipedic in shape.

The pole pieces are maintained in position in their housings by elliptical shaped plates 20 and 21, which are in turn held by screws 22 and 23. An empty space 19 is formed in the center of the cylindrical body 14.

24 is a cap closing the cylindrical body 14 at the top thereof. Cap 24 is maintained in position by screws 25, 26 which are screwed into the cylindrical body 14. A lead seal 27 ensures sealing between the cylindrical body 14 and cap 24.

In the center of the cap is an aperture adapted to receive a metallic sleeve electrode 33 which is connected to the anode. A sealing piece 28 of ceramic is positioned in this aperture. A lead 29 passes within the ceramic sealing piece 28.

Figure 7:
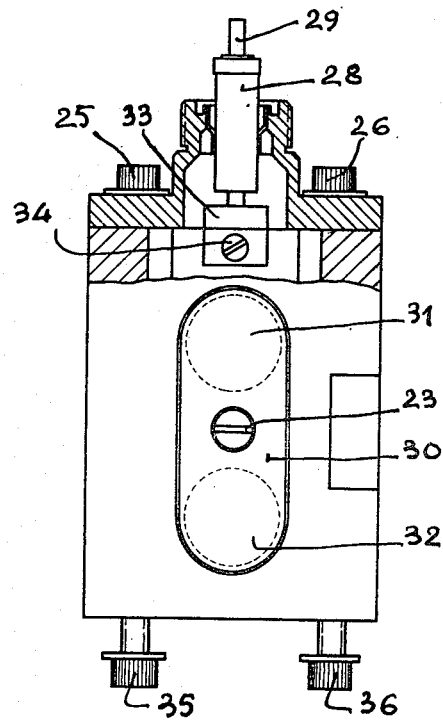
FIG. 7 is a vertical cross-sectional view of the manometer perpendicular to the plane of the cross-section of FIG. 5.

FIGURE 7 shows the mounting of anode 30 which is positioned in the center of housing space 19 and comprises two circular openings 31, 32 which constitute passages for the magnetic fluxes of the pole pieces. The upper position of anode 30 is clamped in the metal sleeve 33 which is secured to the lead 29 by a screw 34.

A removable metal jacket (not shown) takes the interior shape of the cylindrical body 14 and is in permanent contact therewith.

35 and 36 are screws for maintaining the sleeve (not shown) closing the lower portion of cylindrical body 14.

To this sleeve is connected the evacuation tube connecting the Penning gauge to the volume whose vacuum is to be measured.

What we claim is:

1. Cold cathode ionization manometer apparatus comprising a magnet defining a magnet gap and having a plurality of pairs of poles, said magnet gap being between each pair of poles, and at least two electrodes, an anode and a cathode, disposed in said magnet gap separated from each other by a space, and being disposed relatively to each other to allow a free passage for magnetic fluxes between said plurality of pairs of poles to provide adjacent parallel plasmas in said space and gap, the signs and magnetic intensities of said poles being such that, in two of said adjacent parallel plasmas, the magnetic fields are parallel and substantially of the same intensity but of opposite direction, whereby a plurality of parallel plasmas corresponding in number to said plurality of pairs of poles may be formed in said space separating the anode from the cathode in space between each pairs of poles of said plurality of pairs of poles.

2. Manometer apparatus according to claim 1 in which said cathode is of non-magnetic conductive material and has the form of a tube which is open at both ends and with an axial boring extending between said ends, and in which the anode is a thin plate also made of a non-magnetic conductive material, the median plane of the said plate passing through the axis of said tube and said plate being disposed within said boring between said ends, said plate comprising a plurality of openings respectively corresponding to said plurality of pairs of poles.

3. Manometer apparatus according to claim 2 in which the cross-section of the said boring is elliptical.

4. Manometer apparatus according to claim 2 in which the cathode and anode are made of aluminum.

5. Manometer apparatus according to claim 1 in which said cathode is made of a non-magnetic conductive material and is a tube, open at both ends, with an axial boring extending between the said ends, the anode being a thin non-magnetic conductive plate, the median plane of the said plate passing through the axis of said tube, and the said plate being disposed within said boring between the said ends, the said plate comprising a plurality of openings corresponding respectively to said plurality of pairs of poles, at least some of said plurality of openings consisting of small cylinders which are open at both ends thereof, the axes of said cylinders being perpendicular to the plane of the said plate.

6. Manometer apparatus according to claim 2 in which all the said openings consist of small cylinders open at both ends thereof, the axes of said cylinders being perpendicular to the plane of the said plate.

7. Manometer apparatus according to claim 1 in which said magnet comprises two pairs of poles, and in which said anode has two openings respectively facing said poles.

8. Manometer apparatus according to claim 1 in which said anode has a plurality of openings corresponding in number to said plurality of pairs of poles, each opening respectively facing one pair of said plurality of pairs of poles.

References Cited

UNITED STATES PATENTS

| | | | |
|---|---|---|---|
| 2,941,099 | 6/1960 | Picard et al. | 324—33 |
| 2,993,638 | 7/1961 | Hall et al. | 324—33 |
| 3,376,455 | 4/1968 | Jepsen | 313—161 |

RAYMOND F. HOSSFELD, Primary Examiner

U.S. Cl. X.R.

313—7, 217; 324—33